United States Patent [19]

Wenzel

[11] Patent Number: 4,879,867

[45] Date of Patent: Nov. 14, 1989

[54] SELF-PROPELLED MOWER WITH HYDROSTATIC DRIVE

[75] Inventor: Philip H. Wenzel, Vernon Center, N.Y.

[73] Assignee: Ferris Industries, Inc., Oneida, N.Y.

[21] Appl. No.: 276,912

[22] Filed: Nov. 28, 1988

Related U.S. Application Data

[63] Continuation-in-part of Ser. No. 63,007, Jun. 17, 1987, Pat. No. 4,787,195.

[51] Int. Cl.$^4$ ............................................. A01D 69/06
[52] U.S. Cl. ...................................... 56/11.1; 56/11.3; 56/11.5
[58] Field of Search ........................ 56/10.8, 11.1–11.8

[56] References Cited

U.S. PATENT DOCUMENTS

| | | | |
|---|---|---|---|
| 2,689,620 | 9/1954 | Hainke | 56/11.8 |
| 2,805,536 | 9/1957 | De Vere Harnett | 56/11.5 |
| 2,818,699 | 1/1958 | Clemson | 56/11.5 |
| 3,742,685 | 7/1973 | Lian | 56/11.1 |
| 4,326,368 | 4/1982 | Hoff | 56/11.3 |
| 4,454,706 | 6/1984 | Geeck, III | 56/11.3 |
| 4,551,967 | 11/1985 | Murcko | 56/11.3 X |
| 4,558,558 | 12/1985 | Horner | 56/11.3 |

*Primary Examiner*—Thuy M. Bui
*Attorney, Agent, or Firm*—Wall and Roehrig

[57] ABSTRACT

A self-propelled lawnmower employs a hydrostatic transmission and differential to power rear drive wheels which are situated behind a forward mowing deck. The hydrostatic drive has infinitely variable adjustment of speed from reverse, through neutral, to a maximum forward speed. There are independently actuated disc brakes for the drive wheels, with right and left brake levers situated adjacent the operator hand grips. A vertical shaft engine is situated with its center of gravity behind the drive wheel shaft to balance the weight of the mowing deck. The operator can control the speed and direction of the mower without removing his hands from the hand grips. By selecting actuation of the disc brakes, the machine can be effortlessly turned without a reduction in speed. The engine output shaft has pulleys connected by drive belts to the blades and to the hydrostatic drive.

12 Claims, 3 Drawing Sheets

SELF-PROPELLED MOWER WITH HYDROSTATIC DRIVE

CONTINUING APPLICATION DATA

This is a continuation-in-part of my co-pending patent application Ser. No. 063,007, filed June 17, 1987, now U.S. Pat. No. 4,787,195.

BACKGROUND OF THE INVENTION

This invention relates to self-propelled institutional or commercial type lawn mowers, and is especially directed to large lawnmowers intended for extended service on a daily basis, e.g., by commercial landscape gardeners or ground maintenance personnel responsible for attending to lawns at corporate or government office parks, golf courses, condominiums, and the like. The invention is especially directed to walk-behind and sulky-type riding mowers in which there is an operator position situated behind the mowing mechanism.

At present, lawnmowers of this type employ belt drives both for the mower blade and for the drive wheels. In these current mowers, each wheel is belt driven and is provided with a clutch and an individual wheel-brake which are intimately linked. The belts wear out quickly and the drive thus has a high maintenance rate. The belts also tend to slip when the grass is wet. Changing speeds requires disengaging both belts by squeezing hand calipers found on each handle bar. A speed selector control must then be adjusted to effect speed change. Because these actions take considerable time to accomplish, the operator generally opts not to make speed changes. This, however, renders precision mowing near obstacles difficult or impossible. Consequently, an intolerable amount of follow-up mowing with a hand mower or trimmer is usually required. The operator must also release his grip on the steering controls when making various machine adjustments which can and often does lead to an accident.

These same hand calipers when squeezed to their maximum position engage a brake which is used for turning purposes. Because the hand calipers are spring-controlled, they require considerable hand pressure to engage. This continuous hand pressure is extremely tiring. Almost continuous squeezing is required to keep the mower steering in the proper direction due to the direct drive, non differential type axle.

Previous walk-behind mowers generally do not have a reverse speed. Because of the excessive weight of these mowers and their uneven weight distribution, manual backing of the mower is extremely tiring on the operator and is often dangerous.

OBJECTS AND SUMMARY OF THE INVENTION

It is an object of this invention to provide a self-propelled lawnmower which avoids the drawbacks of the prior art.

It is a more specific object of this invention to provide a self-propelled mower with a transmission having both a forward and a reverse direction, and permitting infinitely variable speed selection from a reverse speed, through neutral, to a maximum forward speed.

It is a more specific object of this invention to provide a self-propelled mower with a variable speed, reversing transmission that can be engaged by means of a control device immediately adjacent to the handle bar so that the operator can make speed and direction adjustments without moving his hand from the handle bar. With his hand on the handle bar, the operator can continue to steer the machine by engaging the wheel disc brake, and/or by using operator weight on the handle bars, while at the same time making speed or forward-reverse changes by working the hydrostatic control device.

It is another object of this invention to provide a self-propelled mower with a differential type drive to the rear wheels intimately connected to the variable speed hydrostatic transmission, permitting constant power distribution to both drive wheels.

The differential also permits the operator to make directional steering changes by applying body pressure to the handle bars without having to rely solely on the individual wheel disc brakes.

It is another object of this invention to provide a mower with a drive system which is not affected by moisture which might render the mower unable to propel itself in wet conditions.

In accordance with an aspect of this invention, a self-propelled lawnmower has a mowing deck that supports one or more mowing blades. A pair of drive wheels are rotatably supported in a power deck located behind the mowing deck. Drive linkages convey power from an engine mounted upon the power deck to the rear drive wheels and also to a blade drive system for rotating the mowing blades. An operator position is situated rearward of the drive wheels. The mower includes a handle arrangement behind the drive wheels with operator controls mounted thereon for selectively controlling the speed and direction of the drive wheels. In the mower of this invention, the drive train includes a hydrostatic transmission that has an input shaft driven by the engine, an output shaft arranged to turn the drive wheels, and a control shaft that is rotated to control the ratio of the output shaft speed to the input shaft speed in a continuous range of speeds from reverse, through neutral, to maximum forward speed. The operator controls include a transmission control lever that is connected, for example, via a cable, to the control shaft of the hydrostatic transmission, so that the operator can move the control shaft of the hydrostatic transmission to select a desired drive wheel speed without removing his or her hand from the steering handle. Preferably, there are two ganged thumb levers for this purpose, one on each handle. In a preferred embodiment, the input shaft of the hydrostatic transmission is vertically disposed, and the control shaft e.g., is either vertically or transversely disposed. A control lever for the hydrostatic transmission can include a member that is connected at one end to the control shaft, with a control cable being connected between the control handle and this member. A cooling fan can be mounted on the shaft of the hydrostatic transmission for air cooling the same. The drive wheels are preferably connected to the hydrostatic transmission through a differential type drive system having differential right and left output shafts that serve as axles on which the drive wheels are respectively mounted. These output shafts are provided with independent right and left disc brakes, with separately actuated operating handles, so that the operator can brake the wheels independently for precision steering of the mower.

The vertical shaft engine has two pulleys on its output shaft. One pulley is coupled by a belt to a pulley on the input shaft of the hydrostatic drive and supplies motive power to the drive wheels. The other pulley is connected by a belt to the blade drive system of the wheel deck. This pulley has an associated electric clutch/brake so that the operator can control the coupling of power to the mower blades.

The engine is mounted with its center of gravity rearward of the drive wheel shaft, to serve as a counterweight or counterpoise to balance the weight of the mowing deck. Consequently, the mower center of gravity is disposed at or close to the drive wheel axle. This aids traction significantly and facilitates steering of the machine.

The above and many other objects, features, and advantages of this invention will be more fully understood from the ensuing detailed description of a preferred embodiment, which is to be considered in connection with the accompanying drawing.

DETAILED DESCRIPTION OF A PREFERRED EMBODIMENT

Figure 1:
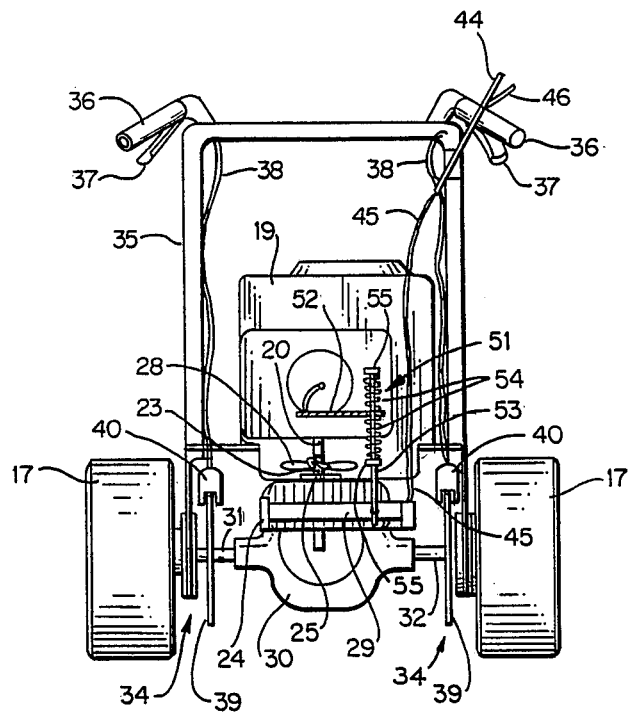
FIG. 1 is a rear elevational view of a walk-behind self-propelled power lawnmower according to a preferred embodiment of this invention.
Figure 2:
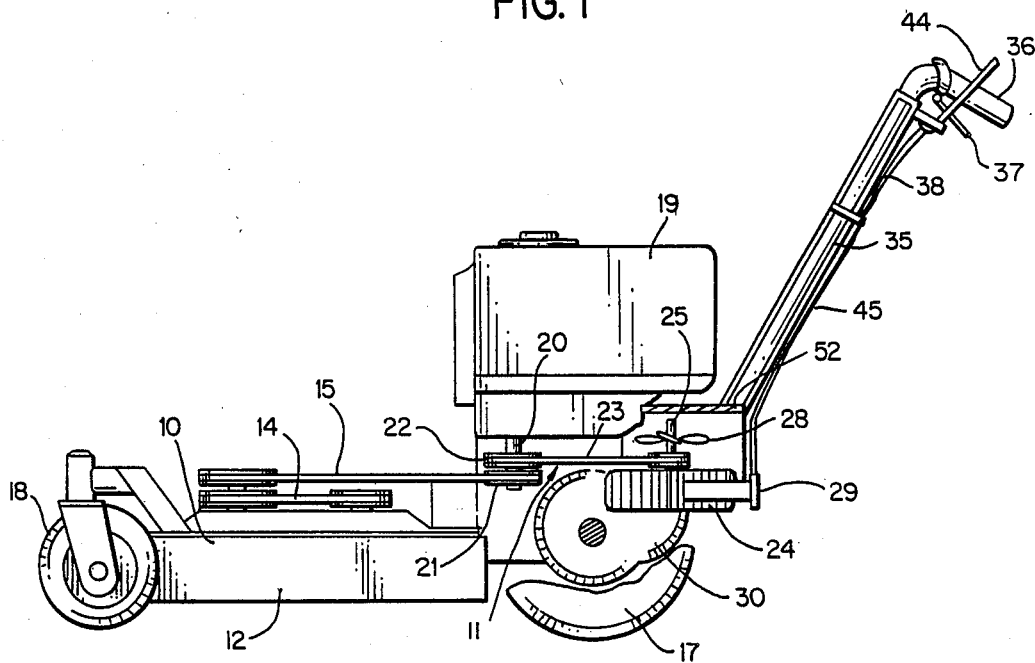
FIG. 2 is a side elevational view, partly cut away, of the lawnmower of this embodiment.
Figure 3:
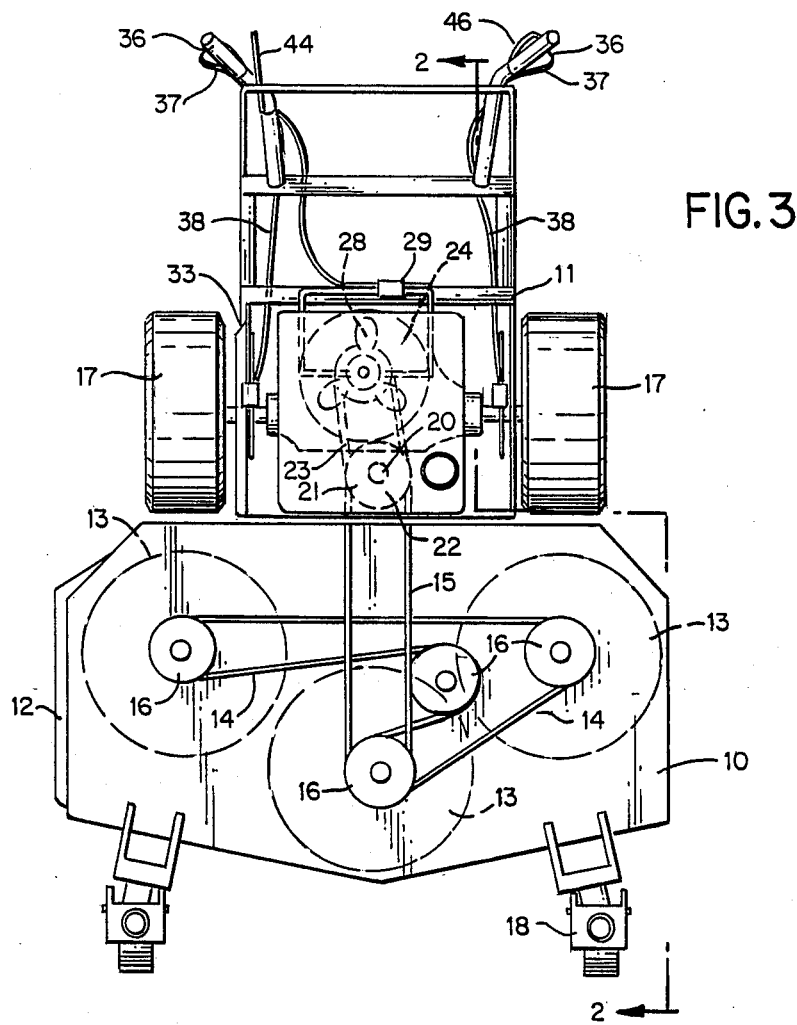
FIG. 3 is a top plan view of the lawnmower of this embodiment.

With reference to FIGS. 1-3 of the drawing, a walk-behind power lawnmower 10 is offered as an example to illustrate the principles of this invention.

The walk-behind rotary self-powered lawnmower 10 has a mowing deck 10 and a power deck 11 located behind the mowing deck. The mowing deck is surrounded by a safety skirt or shroud 12, and contains three rotary blades 13, shown schematically in FIG. 3. The blades 13 are linked together by a secondary belt drive 14, and receive power by means of a primary belt drive 15, with belt drives 14 and 15 travelling over a system of pulleys 16 associated with the blades 13.

A pair of drive wheels 17 are here shown with large-diameter tires, preferably 18×6.50 size, and are rotatably supported in the power deck. A pair of front casters 18, with foam-filled maintenance-free tires, are mounted forward of deck 10.

A gasoline engine 19, here an industrial grade engine of ten to eighteen horsepower, is mounted above the power deck. Its center of gravity is situated aft of the drive wheels 17. In this embodiment, the weight of the engine 19 serves as a balance or counterpoise for the mowing deck assembly.

Balancing the mower more or less about the drive wheel axle gives it advantages not only in steering and traction, but also in its ease of lifting the mowing deck 10 when necessary to perform maintenance or mount curbs and the like by simply pushing down on the handle section.

The engine 19 is of the vertical type, i.e., with a vertical output shaft 20 disposed over the power deck. A pulley 21 which has an incorporated electric clutch brake is mounted on the output shaft 20 and drives the primary belt 15 to provide motor power to the blades 13. Thus, the only connection between the power deck and the mowing deck is the belt drive 15 and pulley 21. Accordingly, many of the aligning and mounting problems found in other mowers are avoided.

A second pulley 22 is also mounted on the engine output shaft 20 and is connected by a drive belt 23 to a hydrostatic transmission 24 that is associated with the rear drive wheels 17.

The hydrostatic transmission 24 is a hydraulic transmission with a vertical input shaft 25 that is connected to a hydraulic transaxle. In this embodiment, an Eaton Model 750 hydrostatic transmission is preferred. A fan 28 is situated on the input shaft 25 to draw 15 cooling air over the housing of the transmission 24.

This hydrostatic transmission 24 permits an operator to control speed and forward/reverse direction of the rear wheels 17 by means of a single operating lever, without requiring clutching.

An actuator lever 29 is mounted on the mower 10 so that one end thereof rotates the control shaft 26.

Figure 4:
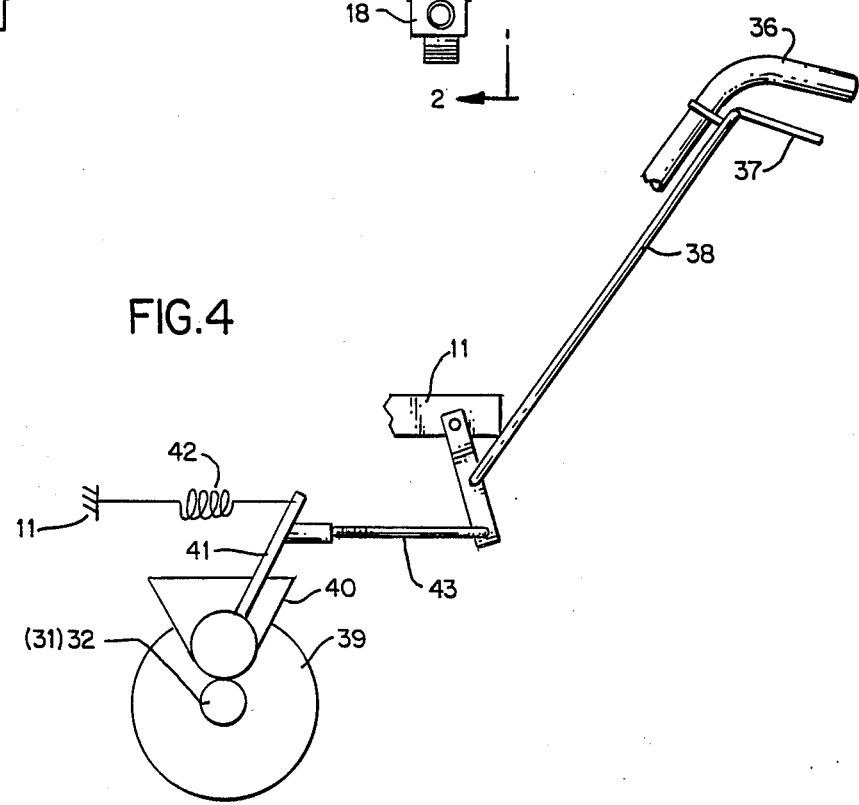
FIG. 4 is a schematic view of a disc brake assembly employed in the lawnmower of this invention.

A gear differential mechanism 30 is connected directly to the output shaft of the transmission 24, and has a right differential axle 31 and a left differential axle 32 serving as outputs thereof, and on which the wheels 17 are respectively mounted. These axles 31 and 32 are journalled in the power deck 11 behind the mowing deck 10. A pair of disc brakes 34, as generally shown in FIG. 4, are respectively mounted on the axles 31 and 32 inboard of the power deck side walls. The disc brakes 34 will be described in detail below.

In another preferred embodiment, the hydrostatic transmission 24 has a pair of horizontal shaft ball-piston motors whose output shafts serve as the right and left differential axles 31,32. In that embodiment a separate gear differential mechanism is not needed, for the differential function is carried out by the hydrostatic transmission.

A handle section 35 disposed rearward of the wheels 17 has right and left hand grips 36 for the operator, with respective right and left brake levers 37 mounted thereon so that the operator can operate the brakes without releasing the hand grips. These levers 37 are coupled by respective cables 38 to the disc brakes 34. On each axle 31,32 there is a brake disc rotor 39, with a respective pad assembly 40 mounted on the sidewalls of the power deck. As shown in FIG. 4, an actuator lever 41 mounted on the pad assembly 40 brings the disc brake pads (not shown) into contact with the associated rotor 39. A return spring 42 biases the lever so that the pads are normally out of contact with the rotor 39. A linkage 43 operatively couples the associated brake cable 38 with the actuator lever 41.

Also mounted on the handle section, near each of the grips 36, are transmission control thumb levers 44, which are gauged to move together and are connected by a control cable 45 to the actuator lever 29. Using either transmission lever 44, the operator can simply regulate the speed and direction of rotation of the hydrostatic transmission 24. This dual thumb lever feature facilitates turning in either direction.

The operator must engage a lever switch 46 on the handle grip 36 to engage the clutch/brake pulley 21. Release of this lever switch 46 will disengage the blade 13. This can also be arranged to disengage automatically unless the operator has at least one hand on the grips 36.

As mentioned previously, the mower can be constructed entirely of heavy duty materials, because the mower is so much easier to control than previous mowers of similar type, notwithstanding its greater weight. For greater safety and ease of operation, the control lever 44 for the transmission 24 is located immediately adjacent to the steering handle grip 36 so that the operator can adjust the drive wheel speed without moving his or her hand from the steering handle 35. One or both levers 44 are moved forward to adjust the mower speed from neutral to forward. If either lever 44 is moved further forward, the mower 10 travels faster. The precise speed desired for mowing conditions can be set with the infinitely variable speed hydrostatic transmission 24 simply by adjusting the position of lever 44 as appropriate. Similarly, by moving either lever 44 to the rear, the mower 10 is caused to travel in reverse at the desired speed.

As shown in FIG. 1, an optimal return-to-neutral spring assembly 51 is coupled to a flange of the power deck 11 and to the lever 29. This assembly 51 biases the drive control lever 44 towards a neutral position, so that when the lever 44 is released when in either a forward or a reverse position, the hydrostatic transmission automatically returns to a neutral position. Here, a fixed plate, or flange 52 on the power deck 11, journals a rod 53 that slides through this plate 52 and is attached via the cable 45 to the lever 29. Relatively soft springs 54 bias against the plate 52 and against stops 55 on the rod 53. The springs 54 have a low spring rate, so the thumb levers 44 are easily held at a desired position by the operator while the mower is in operation. In many instances, the natural tendency of the hydrostatic transmission 24 to seek neutral will make this feature unnecessary. However, the positive spring biasing to neutral is useful where a rapid return to neutral is required, e.g., for safety purposes.

Unlike other mowers, with this mower it is not necessary to disengage any belts to effect a directional change. In other similar lawnmowers, a spring-actuated clutch, which disengages the belt drive, requires a strong gripping action to actuate, and because directional changes are frequent, steering with these belt-driven mowers can be exhausting and difficult work. The belts are also exposed to constant wear as they are clutched in and out of engagement thus requiring frequent replacement.

The present mower can be steered in either of two ways:

1. Because of the differential drive, the operator can simply apply body weight to the handle bars to make directional changes. This is impossible with present mowers because each wheel is differentially coupled to the drive shaft.

2. Each wheel is fitted with a disc brake which is engaged by means of a hand caliper on a corresponding handle. Engaging the disc brake is much easier than engaging the hand brake on other mowers because there is no spring-actuated clutch in the present brake linkage. Squeezing a selected hand caliper to engage one of the disc brakes results in an almost effortless turn toward the braked wheel side of the machine.

The operator can change speeds and engage the wheel brakes simultaneously for the sharpest possible corners. Because of the excellent control over the mower, an operator can trim close to walls or plantings. This precision in mowing eliminates most of the trimming and follow-up hand mowing that is required when other mowers are employed. Also, because of its steering precision, a much wider mowing deck can be employed than with current mowers, which further reduces mowing time and operator fatigue.

Because there are no belts associated with the rear drive wheels, or disposed beneath the mowing deck 10, moisture will not affect the drive linkages or slow down the mower operation. The heavy duty hydrostatic transmission 24 and differential 30 require little maintenance, and exhibit long life. When servicing is required, only simple hand tools and basic mechanical skills are required, and routine maintenance would require much less time than is needed for belt-driven mowers. If the mowing deck must for some reason be removed, the drive belt 22 connecting it to the engine can be easily detached and reinstalled without difficulty.

Figure 5:
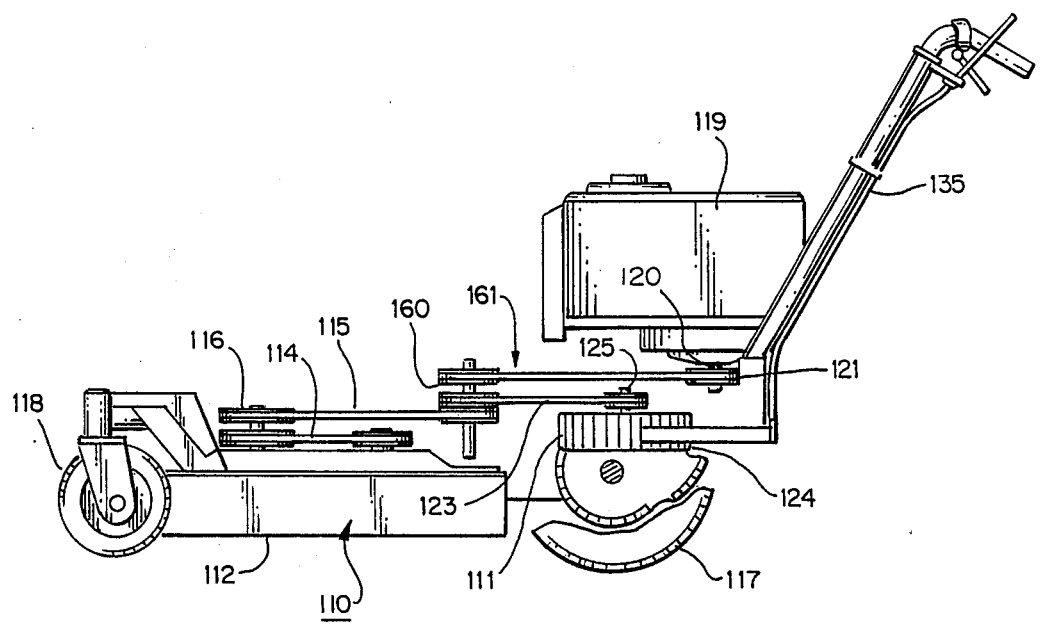
FIG. 5 is a side elevational view of another embodiment of this invention.
Figure 6:
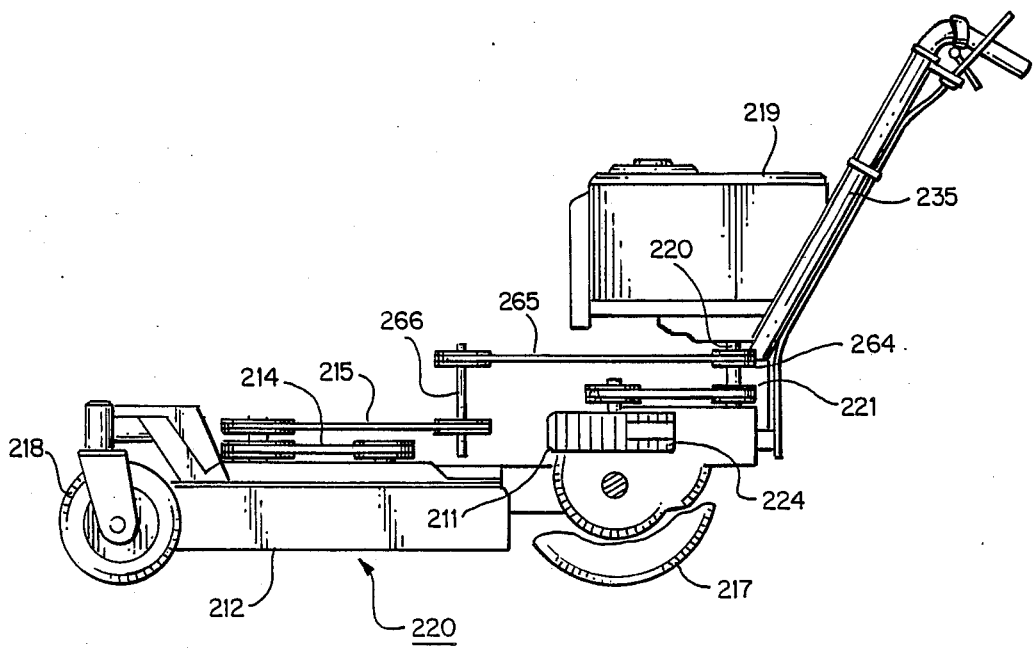
FIG. 6 is a side elevational view of still another embodiment of this invention.

FIGS. 5 and 6 show alternative mowers in which the engine is mounted aft of the hydrostatic transmission. In each mower there is an auxiliary vertical jack shaft to couple the engine output shaft to the drive belt for the mower blades. In FIG. 5 the same reference numbers are employed as in the first embodiment, but raised by 100 to identify corresponding elements. These elements are not described in detail here, except to explain the feature permitting the engine to be mounted to the rear of the hydrostatic transmission. In the FIG. 6 mower, similar elements are identified by the same reference numbers, but raised by 200.

As shown in FIG. 5, the engine 119 is mounted so that its output shaft 120 is aft of the hydrostatic transmission 124. Here, an auxiliary vertical shaft or jack shaft 160 has a pulley 161 connected by a belt to the engine output shaft pulley 121. The jack shaft 160 has a pulley 161 connected by a belt to the engine output shaft pulley 121. The jack shaft 160 has a pulley 162 to drive the belt 123 to the input shaft 125 of the hydrostatic transmission, and a clutch/brake pulley 163 which powers the primary mower blade belt 115.

The FIG. 6 mower operates similarly. Here the engine output shaft 220 has a clutch/brake upper pulley 264 that is coupled by a belt 265 to a jack shaft 266, the latter driving the mower primary belt 215. The engine output shaft 220 also has another pulley 221 from which the wheel drive belt 223 extends forward to turn the input shaft 225 of the hydrostatic transmission 224.

While the invention has been described in detail with reference to the structure disclosed herein, it is not confined to details set forth and this application is intended to cover many modifications and variations as may come within the scope of the following claims.

What is claimed is:

1. A self-propelled mower that comprises
    a front mower deck housing a blade assembly containing one or more movable blades;
    a rear power deck containing an engine, a pair of drive wheels and a power train coupling the engine to the drive wheels, wherein the engine has a vertically disposed output shaft positioned over the power deck, and power takeoff means for connecting the blade assembly to said output shaft;
    handle bar attached to the back of the power deck for steering the drive wheels;
    said power train including a hydrostatic transmission having an input shaft means connected to the engine, an output means, differential means having an input coupled to the hydrostatic transmission output means and a pair of differential output shafts serving as drive axles for said drive wheels, and a speed regulator to set the speed ratio of the differential output shafts to the input shaft means within a continuous range from reverse through neutral, wherein said output shaft is idle, to maximum forward; and control lever means positioned on the handle means that is connected to the speed regulator for setting said speed regulator at any desired position within said continuous range so that the operator can select a desired wheel speed without releasing the handle means or uncoupling the transmission from the engine.

2. The self-propelled mower of claim 1 further comprising first and second pulley means on said engine output shaft, with a first belt rotationally coupling the first pulley means to the input shaft means of the hydrostatic transmission, and a second belt rotationally coupling the second pulley means with said one or more blades of said mowing deck.

3. The self-propelled mower of claim 2 wherein said second pulley means includes an electric clutch/brake for selectively powering or unpowering the one or more blades of the mowing deck.

4. The self-propelled mower of claim 1 further comprising independent disc brake means actuable independently of said hydrostatic transmission and differential means, and associated with each drive axle for independently braking each drive wheel.

5. The self-propelled mower of claim 1 further comprising a blower for air cooling the hydrostatic transmission.

6. The self-propelled mower of claim 1 wherein said control lever means includes means for biasing the same to a neutral position so that the hydrostatic transmission will automatically assume its neutral speed whenever the lever means is released by the operator.

7. The self-propelled mower of claim 1 wherein said blade assembly includes a plurality of rotary blades with associated drive pulleys, and a blade drive belt passing over said drive pulleys to connect rotatably with said rotary blades; and said power take off means includes a primary belt separate from said blade drive belt connecting the engine output shaft with said blade drive belt.

8. The self-propelled mower of claim 7 wherein said primary belt is disposed horizontally to connect said engine output shaft to a pulley of said blade assembly.

9. The self-propelled mower of claim 8 wherein said primary belt and said blade drive belt are situated above the mowing deck thus to position the belts away from grass being mowed to avoid slippage when the grass is wet.

10. The self-propelled mower of claim 1 wherein said handle means includes right and left hand grips, and said control lever means includes a pair of thumb levers coupled to act together and each thumb lever being mounted at an associated one of the hand grips so that the operator can control the wheel speed with either hand.

11. The self-propelled mower of claim 1 wherein said engine is mounted with its output shaft disposed aft of the hydrostatic transmission input shaft.

12. The self-propelled mower of claim 11 wherein said power take off means includes an auxiliary vertical jack shaft in advance of said hydrostatic transmission with a pulley connected by a belt to said engine output shaft and a pulley coupled to another belt to drive said blades.

* * * * *